No. 654,090. Patented July 17, 1900.
H. T. CROSBY.
CULTIVATOR ATTACHMENT.
(Application filed Mar. 26, 1900.)

(No Model.)

WITNESSES:
M. S. Blondell
F. S. Stitt

INVENTOR
H. T. Crosby.
BY Munn & Co.
ATTORNEYS

UNITED STATES PATENT OFFICE.

HENRY T. CROSBY, OF COLEMAN, TEXAS.

CULTIVATOR ATTACHMENT.

SPECIFICATION forming part of Letters Patent No. 654,090, dated July 17, 1900.

Application filed March 26, 1900. Serial No. 10,184. (No model.)

*To all whom it may concern:*

Be it known that I, HENRY T. CROSBY, of Coleman, in the county of Coleman and State of Texas, have invented a new and useful Improvement in Cultivator Attachments, of which the following is a specification.

My invention relates to agricultural implements, more especially harrows or cultivators; and it has for its objects a device which can be conveniently attached to the standards or footpieces of any cultivator and which may hold or carry different numbers of small plows or harrow-teeth for the cultivation of any crops or at any place where a small harrow is needed; and it is designed to be of comparatively-light construction and few and simple parts, whereby it can be very cheaply made and readily attached and removed from operative position.

The invention consists in certain specific features of construction, which I shall hereinafter fully describe and claim.

Reference is to be had to the accompanying drawings, forming part of this specification, in which like characters of reference indicate corresponding parts in all the views.

Figure 1:
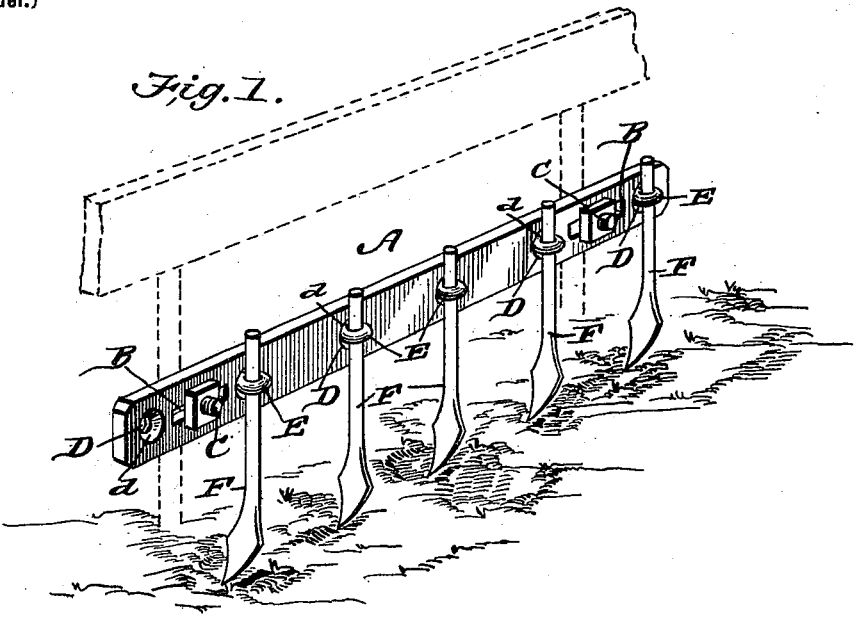
Figure 2:
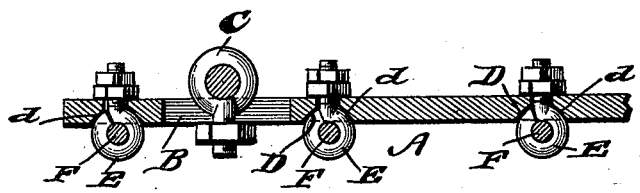
Figure 3:
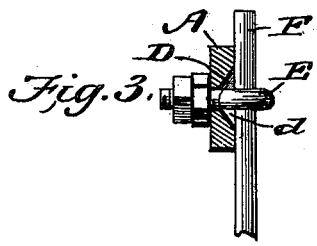

Figure 1 is a perspective view of my improvement. Fig. 2 is a horizontal section of a portion of the same, and Fig. 3 is a vertical section.

Referring to the drawings by reference-letters, A designates my improved cultivator attachment, which is a flat bar of iron or other metal of suitable length and thickness and which is formed near its ends with longitudinally-extending slots B, in which are adjustably fitted eyebolts C, adapted to receive the footpieces or standards of a cultivator, the adjustment allowing for varying distances between standards of different cultivators. The bar A is further provided with a plurality of equidistant apertures D, any or all of which are adapted to receive eyebolts E for holding small pointed plows or harrow-teeth F, which preferably have rounded shanks, whereby they may be turned in their eyebolts at different angles, as may be required. The apertures D are countersunk on one side, as shown at $d$, and are of such depth that the shanks of the harrow-teeth will abut tightly against the side of the bar A when the eyebolts are screwed up in place.

My attachment is designed to be used in pairs, one on each side of a cultivator.

Having thus described my invention, what I claim as new, and desire to secure by Letters Patent, is—

1. The herein-described cultivator attachment consisting of a bar A having elongated slots B adapted to receive fastening means whereby it may be attached to a cultivator, and also having a plurality of apertures adapted to receive fastening means for plows or harrow-teeth, as and for the purpose set forth.

2. The herein-described cultivator attachment, consisting of a bar A having longitudinally-extending slots B in which are inserted eyebolts C adapted to receive the footpieces or standards of a cultivator, said bar being further provided with a plurality of apertures D through which are inserted eyebolts E adapted to receive the shanks of harrow-teeth F, the said apertures being countersunk on one side to such a depth that the shanks of the teeth will abut tightly against the side of the bar when the eyebolts E are screwed up, as and for the purpose set forth.

In testimony whereof I have signed my name to this specification in the presence of two subscribing witnesses.

HENRY T. CROSBY.

Witnesses:
R. V. WOOD,
J. M. WOOD.